United States Patent Office 3,586,739
Patented June 22, 1971

3,586,739
GLYCIDYL DERIVATIVES OF BIS(HYDROXY-4-PHENYL) ACETIC ACID
Pierre Talet, Alfortville, and Robert Behar, Paris, France, assignors to Nobel-Bozel, Puteaux, Hauts-de-Seine, France
No Drawing. Continuation-in-part of application Ser. No. 451,340, Apr. 27, 1965. This application July 28, 1969, Ser. No. 845,571
Int. Cl. C08g 45/04
U.S. Cl. 260—837                                   9 Claims

ABSTRACT OF THE DISCLOSURE

Thermosetting acrylic paints utilizing a new group of epoxy compounds which are derivatives of bis(hydroxy-4-phenyl) acetic acid. These epoxy compounds have the formula

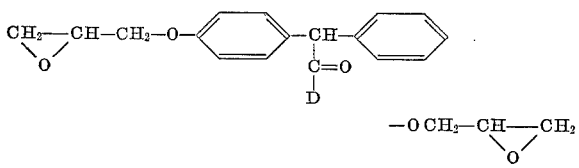

wherein D is —O—$R_1$ or

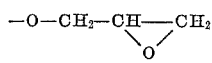

and $R_1$ is an aliphatic hydrocarbon radical of no more than 12 carbon atoms, an alicyclic hydrocarbon radical of no more than 12 carbon atoms or an aromatic hydrocarbon radical of no more than 12 carbon atoms.

---

This is a continuation-in-part application of copending application Ser. No. 451,340, filed Apr. 27, 1965, now Pat. No. 3,499,008. This application is filed under the provisions of 35 U.S.C. 121.

The present invention relates to new thermosetting acrylic paint compositions containing new epoxy derivatives of bis(hydroxy-4-phenyl) acetic acid.

The epoxy compounds used in the present invention comply with the general formula:

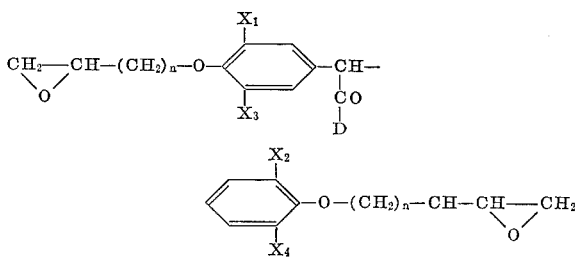

In this formula, each of the terms $X_1$, $X_2$, $X_3$ and $X_4$ represent a hydrogen atom; the term D represents a residue of the general formula —O—$R_1$ (the symbol $R_1$ representing an aliphatic hydrocarbon residue such as an alkyl group or an alicyclic or aromatic hydrocarbon residue preferably having no more than twelve carbon atoms) or a residue of the general formula:

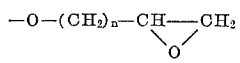

where $n=1$ or 2.

Amongst the new products of the invention, there may be more particularly cited:

The butyl ester of bis (glycidyl-oxy-4-phenyl) acetic acid:

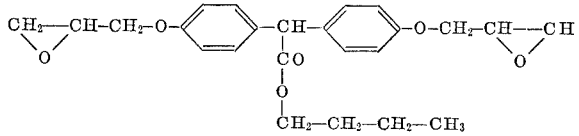

The glycidyl ester of bis (glycidyl-oxy-4-phenyl) acetic acid:

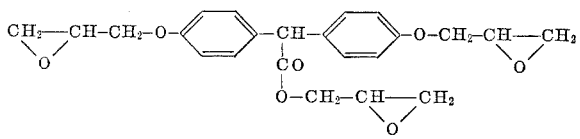

Other compounds include:

The propyl ester of bis(glycidyl-oxy-4-phenyl) acetic acid.
The amyl ester of bis(glycidyl-oxy-4-phenyl) acetic acid.
The ethyl-2-hexyl ester of bis(glycidyl-oxy-4-phenyl) acetic acid.
The dodecyl ester of bis(glycidyl-oxy-4-phenyl) acetic acid.
The toluene ester of bis(glycidyl-oxy-4-phenyl) acetic acid:

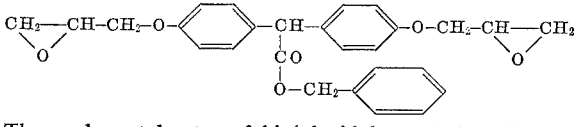

The cyclopentyl ester of bis(glycidyl-oxy-4-phenyl) acetic acid:

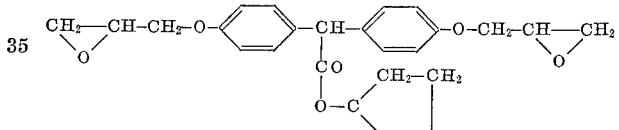

These new products can be employed especially as useful constituents of thermosetting acrylic paints. Such acrylic paints then comprise:

(a) an acrylic copolymer capable of being cross-linked by an epoxy resin,
(b) pigments, and
(c) an epoxy compound derivative of bis(hydroxy-4-phenyl) acetic acid as described above and, if desired, a melamine-formal-dehyde resin.

The amount of the epoxy compound varies from 10 to 30% expressed in terms of weight of dry material based on weight of dry material of the acrylic copolymer.

The method of preparation of the compounds used in the invention consists in reacting bis(hydroxy-4-phenyl) acetic acid or one of its esters (which in turn may be prepared from the acid and an alcohol) with a halogen-comprising compound such as a halide of alpha-epoxy, the reaction being carried out in such a manner that the compound comprising the halogen reacts on the molecule of the said acid with the elimination of an atom of hydrogen in the form of halogenated acid and substitution on the phenol oxygen, in the place of the hydrogen, of the remainder of the molecule of the reacting product.

In order to prepare the compounds exemplified above, the bis(hydroxy-4-phenyl) acetic acid or one of its esters is reacted preferably in the presence of an alkali, with a halide of alpha-epoxy having the formula:

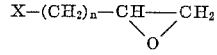

in which X represents an atom of chlorine or bromine, and the factor $n$ is equal to 1 or 2.

In order to simplify this, if the residue

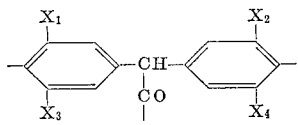

is represented by

the butyl ester of bis (hydroxy-4-phenyl) acetic acid is represented by:

$$HO-E-OH$$
$$\ \ \ \ \ \ |$$
$$\ \ \ \ \ O-C_4H_9$$

In accordance with the invention, this compound gives, by reaction with epichloro-hydrin, the butyl ester of bis (glycidyloxy-4-phenyl)acetic acid following the simplified reaction:

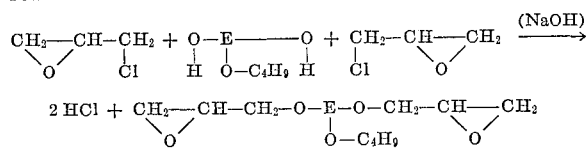

By causing the epichloro-hydrin to react in the presence of NaOH with bis (hydroxy-4-phenyl) acetic acid

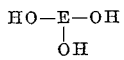

there is obtained the glycidyl ester of bis (glycidyl-oxy-4-phenyl) acetic acid,

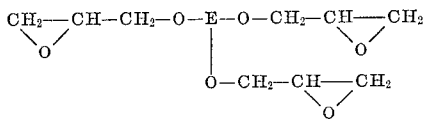

The following examples are given for the purpose of illustrating the invention, on the one hand with regard to the preparation of a certain number of the new compounds of the invention, and on the other hand with regard to some of their applications.

EXAMPLE 1

There is first prepared the butyl ester of bis (hydroxy-4-phenyl) acetic acid and then this is epoxided with chloro-3-epoxy-1,2-propane.

In a flask of 2 litres, there are introduced 122 grams of bis (hydroxy-4-phenyl) acetic acid (0.5 mol.) 74 grams of butanol (1 mol.), 500 ml. of benzene and 3 ml. of sulphuric acid at 66° Baumé.

This mixture is then heated to boiling while recovering 15 ml. of water in 4 hours reaction. The temperature rises from 77° to 82° C.

475 ml. of benzene are then distilled and 200 ml. of water are added. The precipitate is filtered and washed twice with 200 ml. of water, the water is removed, and finally it is dried.

There are obtained 141 grams of dry butyl ester, namely 94% of the theoretical quantity.

In a 2-liter flask there are placed 333 grams of epichloro-hydrin (3.6 mols.) 100 grams of butyl ester of bis (hydroxy-4-phenyl) acetic acid (0.33 mol.) and 75 grams of isopropanol. The mixture is brought up to reflux (96° C.) and there is then introduced into the flask in 40 minutes, 32 grams of caustic soda previously dissolved in 32 grams of water.

After having left to digest for 30 minutes, the mixture is distilled under normal pressure up to 105° C.; then it is filtered so as to eliminate the separated sodium chloride. The filtrate is again subjected to distillation under a vacuum of 6 mm.

The distillation is carried out until the temperature inside the flask reaches 110° C.

There are thus obtained 118 grams of butyl ester of bis (glycidyl-oxy-4-phenyl) acetic acid, which represents a yield of 86% of the theoretical value.

The product obtained has a molecular weight of 412 and is very pure, since its epoxide number, determined by analysis, is 0.46 while the number of theoretical epoxide (that is to say the calculated number of epoxy groups per 100 grams of product) is 0.48.

Rough formula of the compound $C_{24}H_{28}O_6$: C (percent) theory=69.9; determined=69.4; H (percent) theory=6.8; determined=6.82.

This product, referred to as "Product XIV" for the sake of simplicity, is in the form of a liquid of light amber color, having a viscosity of 27 to 36 stokes; it is soluble in xylene and Cellosolve, and, in addition, it has an excellent solubility in butanol, which gives it a superiority as compared with the conventional epoxy compounds.

Furthermore, by reason of its excellent compatibility in very different media, the Product XIV enables technical progress to be obtained, especially for example in the application of thermosetting acrylic resins.

In particular, a very important case is that of acrylic paints.

By way of example, there was prepared a solution of polymer with the following ingredients. 25 parts by weight of styrene+33.15 parts of methyl methacrylate+28.8 parts of butyl acrylate+12 parts of acrylamide+0.96 part of acrylic acid+0.64 part of lauryl-mercaptan+0.45 part of glyoxal tetra-allyl-acetal (which is the object of the applicants' U.S. Pat. No. 3,197,447 of July 27, 1965). The solvents utilized were xylene+butanol.

The polymerization was carried out with reflux in the presence of benzoyl peroxide, until the measured dry extract attained a resin content of 50%. This was then converted to paint by adding an epoxy compound (see below) and pigmenting with titanium oxide. For this purpose, the titanium oxide (rutile) was dispersed in an ethyl-glycol, methyl-glycol and ethyl-glycol acetate mixture, and incorporated in the resin solution so as to obtain finally a ratio of pigment/resin (expressed as dry material) of 0.73.

In the case of conventional epoxy resins, the epoxy is generally added at the time of use, that is to say, at the moment of preparation of the paint and just before the paint is use. If the epoxy resin were mixed at the outset with the acrylic resin, it would give rise during storage to a cloudiness or even a precipitation in the mixture, wihch would adversely effect its qualities as a coating product.

This serious drawback can be avoided if the conventional epoxy resins are replaced by certain products of the present invention, for example by the Product XIV.

In order to bring out clearly the performances obtainable with the products according to the invention, samples were first prepared of the following products:

($A_0$) to a solution of polymer prepared in the manner indicated above, there was intimately mixed a quantity of product XIV corresponding to 12% of the weight of dry polymer.

($B_0$) the same preparation but the Product XIV being replaced by an identical weight of a conventional epoxy resin.

($A_3$) A part of Sample $A_0$ was stored for three months and thus became sample $A_3$.

($B_3$) A part of the sample $B_0$ was stored for three months and thus became sample $B_3$.

(p$A_0$) The mixture $A_0$ (freshly prepared) was converted to paint in the manner indicated above; this resulted in the paint p$A_0$.

(p$B_0$) In the same way, the mixture $B_0$ (freshly prepared) was converted to the paint p$B_0$.

(p$A_3$) In the same manner, the mixture $A_3$ (stored for three months) was converted to the paint p$A_3$.

(p$B_3$) In the same manner, the mixture $B_3$ (stored for three months) was converted to the paint p$B_3$.

The paints $pA_0$, $pB_0$, $pA_3$ and $pB_3$ were utilized immediately after they were prepared.

With these various samples, the following have been noted:

(1) Mixtures of polymer and epoxy product after three months storage: Sample $A_3$: unchanged; solution perfectly clear. Sample $B_3$: intensely clouded; slight precipitate (such a difference is already very important commercially since a resin which clouds during storage and which deposits a precipitate is hardly saleable).

(2) Paints made with the freshly-prepared mixtures: For the tests of determination of quality, the paints were applied by means of a Touzart & Matignon applicator on plates of chilled de-greased steel having the dimensions 200 x 100 x 1 mm.

A film of paint was applied so as to obtain a thickness of 30 to 40 microns.

A pre-drying is effected for 10 minutes with protection from dust and the film is then baked at 180° C. for 30 minutes in a ventilated oven, after which the plates are left in the surrounding atmosphere for 24 hours before the measurements are made; these are carried out at a temperature as close to 20° C. as possible.

The tests of quality are then carried out (hardness, flexibility, resistance to shocks, adherence, brilliance, resistance to detergents, resistance to hot grease, resistance to solvents, etc.).

The flexibility for example is measured by means of an Ericksen apparatus (Touzart & Matignon). It is expressed in millimetres of penetration up to breaking of the film.

The hardness is measured with the Perzoz pendulum on a zone of thickness comprised between 30 and 40 microns. The mean of three measurements is taken. The difference between each measurement should not exceed 5 seconds.

The brilliance is measured with the Perzoz luminosity meter. The measurements are made in comparison with a standard plate, the brilliance of which is taken as 100.

Results: Practically no differences were observed with regard to the tests of quality of the paints $pA_0$ and $pB_0$.

(3) Paints made with the mixtures stored for three months:

Sample $pA_3$: The results of the quality tests are practically the same as for the paints $pA_0$ and $pB_0$.

Sample $pB_3$: The results of the quality tests are definitely inferior to those of the paints $pA_0$ and $pB_0$, especially with regard to:

Flexibility, the test value of which fell to 6 (against about 9 for $pA_3$, $pA_0$ and $pB_0$);
Brilliance, which fell to 62% (against about 87% for $pA_3$, $pA_0$ and $pB_0$).

In consequence, as compared with a conventional epoxy resin, the Product XIV gives definitely superior technical performances in acrylic paints.

EXAMPLE 2

In a flask of 2 litres, there is heated to boiling a mixture of 126 grams of bis (hydroxy-4-phenyl) acetic acid at 97% (0.5 mol.), 694 grams of epichloro-hydrin and 75 grams of isopropanol. There is then introduced in 45 minutes, 63 grams of caustic soda previously dissolved in 67 grams of water. The boiling is continued for half an hour, after which the mixture is distilled up to 110° C. at ordinary pressure, in order to eliminate the isopropyl alcohol, the water and excess epichloro-hydrin. The mixture is cooled at room temperature and filtered to eliminate the precipitated sodium chloride. It is then re-distilled under a vacuum of 35 mm. of mercury up to 110° C.

In this way, there are collected 165 grams of solid product of a pale amber color which, following analysis, is found to be the glycidyl ester of bis (glycidyl-oxy-4-phenyl) acetic acid: Product XV Empirical formula $C_{23}H_{24}O_7$
Epoxy number found: 0.71 (theoretical 0.728)

The Product XV is soluble in the aromatic solvents such as benzene, toluene, xylene, and also in dioxane; it is insoluble in the alcohols and permits the obtention of useful paint compositions having good properties.

EXAMPLE 3

The ethyl-2 hexyl ester of bis(hydroxy-4-phenyl) acetic acid is firstly prepared using the same process as in Example 1, then phenol groups are reacted on chloro-3-epoxy-1,2-propane in the presence of caustic soda by a process similar to that described in Example 1. Ethyl-2-hexyl ester of bis(glycicyloxy-4-phenyl) acetic acid is thus obtained. This product has a molecular weight of 468; its epoxide index calculated is of 0.427 and the epoxide index found by analysis is of 0.41.

This product is used in an acrylic paint as follows:

A polymer solution was prepared from the following compounds: 78 parts by weight of styrene 88 parts by weight of ethyl acrylate, 15 parts by weight of acrylamide, 34.2 parts by weight of acrylamido-glycolic acid (see U.S. Pat. No. 3,422,139), 4.0 parts by weight of acrylic acid, 0.6 part by weight of tetraallyloxyethane (see U.S. Pat. No. 3,197,447), 1.3 parts by weight of lauryl mercaptan. The solvents used were xylene and butanol.

The polymerization was carried out with reflux in the presence of benzoyl peroxide; a copolymer solution containing 40% by weight of dry materials was thus obtained. To the resulting solution, 60 parts by weight of a mixture of formaldehyde-butanol at 40% of formaldehyde and 1.92 parts by weight of maleic acid were added and an azeotropic stripping was carried out until the temperature was 114°–115° C.

After cooling, the solvents were distilled off under vacuum then the residue was adjusted to 50% by weight of dry materials with xylene. With such an acrylic copolymer solution, the following tests were conducted:

(A) Mixtures of copolymers and ethyl-2 hexyl ester of the acid: a 50% copolymer solution was mixed with an amount of ethyl-2-hexyl ester corresponding to 12% by weight of the dry polymer. After a storage during a period of 3½ months, the mixture was still clear.

(B) Paint preparation: 10 parts by weight of the acrylic copolymer solution at 50% of dry materials were ground during 12 hours in a ball mill with 41.66 parts of titanium oxide (rutile) and 6.25 parts of solvents.

25 parts of the acrylic copolymer solution were then added and the grinding was continued for 3 hours, and further 40.07 parts of the acrylic copolymer solution were added with 24.93 parts of melamine-formaldehyde resin at 50% by weight and 13.58 parts of ethyl-2 hexyl ester of bis(glycidyl-oxy-4-phenyl) acetic acid.

Films of the resulting paint were applied on clean steel plates in order to obtain a film having, after curing, a thickness of from 30 to 40 microns.

After pre-drying, the film was heated 30 minutes at 130° C. and the measures were effected at about 20° C. after standing 24 hours at ambient atmosphere.

The hardness measured with the Persoz pendulum is 4 minutes and 40 seconds. The flexibiliy measured with the Ericksen apparatus is 8.5.

The resulting film is glossy and has an excellent detergent-resistance.

EXAMPLE 4

By repeating the preceding process, the propyl, amyl, dodecyl, toluene and cyclopentyl esters of bis (hydroxy-4-phenyl) acetic acid have been, respectively prepared and then reacted with chloro-3-epoxy-1,2 propane in the presence of caustic soda in order to obtain the corresponding esters of bis(glycidyl-oxy-4-phenyl) acetic acid. The ester mixtures were prepared in a manner similar to that of Example 1 with an acrylic copolymer. After 3 months' storage, these mixtures were still clear.

Also paints were prepared as in Example 1 in replacing the butyl ester of bis(glycidyl-oxy-4-phenyl) acetic acid by the preceding esters. The films obtained with these paints were flexible, glossy, and had a good detergent resistance; their hardness varies with the nature of the esterifying agent of the bis(glycidyl-oxy-4-phenyl) acetic acid.

It will of course be understood that the present invention has only been described purely by way of explanation and not in a limitative sense and that any useful modification may be made thereto without departing from its scope.

What is claimed is:
1. A paint composition consisting essentially of:
 (a) an acrylic resin capable of being cross-linked by an epoxy compound and containing amido and carboxy groups;
 (b) pigment; and
 (c) from 10% to 30% by weight based on the weight of the acrylic resin of an epoxy compound of the formula:

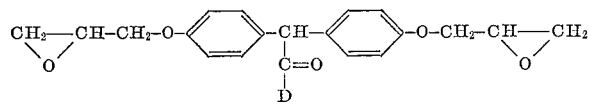

wherein D is —O—$R_1$ or

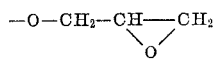

and $R_1$ is an aliphatic hydrocarbon radical of no more than 12 carbon atoms, an alicyclic hydrocarbon radical of no more than 12 carbon atoms or an aromatic hydrocarbon radical of no more than 12 carbon atoms.

2. A paint composition in accordance with claim 1 wherein said epoxy compound comprises a glycidyl ester of bis(glycidyl-oxy-4-phenyl) acetic acid.

3. A paint composition in accordance with claim 1 wherein said epoxy compound comprises a propyl ester of bis(glycidyl-oxy-4-phenyl) acetic acid.

4. A paint composition in accordance with claim 1 wherein said epoxy compound comprises an amyl ester of bis(glycidyl-oxy-4-phenyl) acetic acid.

5. A paint composition in accordance wtih claim 1 wherein said epoxy compound comprises an ethyl-2-hexyl ester of bis(glycidyl-oxy-4-phenyl) acetic acid.

6. A paint composition in accordance with claim 1 wherein said epoxy compound comprises a dodecyl ester of bis(glycidyl-oxy-4-phenyl) acetic acid.

7. A paint composition in accordance with claim 1 wherein said epoxy compound comprises a toluene ester of bis(glycidyl-oxy-4-phenyl) acetic acid.

8. A paint composition in accordance with claim 1 wherein said epoxy compound comprises a cyclopentyl ester of bis(glycidyl-oxy-4-phenyl) acetic acid.

9. A paint composition in accordance wtih claim 1 wherein said epoxy compound comprises a butyl ester of bis(glycidyl-oxy-4-phenyl) acetic acid.

References Cited
UNITED STATES PATENTS

| | | | |
|---|---|---|---|
| 3,197,447 | 7/1965 | Talet | 260—85.7 |
| 3,268,619 | 8/1966 | Nametz | 260—348 |

FOREIGN PATENTS 253,030   5/1963   Australia.

OTHER REFERENCES

Chemical Abstracts, vol. 55, pp. 23, 439 (1961).

PAUL LIEBERMAN, Primary Examiner

U.S. Cl. X.R.

260—37, 41, 80.8, 348, 834, 836